US005739672A

United States Patent [19]
Lane

[11] Patent Number: 5,739,672
[45] Date of Patent: Apr. 14, 1998

[54] METHOD AND APPARATUS FOR CHARGING BATTERIES

[75] Inventor: Robert W. Lane, Chandler, Ariz.

[73] Assignee: United Continental, Phoenix, Ariz.

[21] Appl. No.: 646,873

[22] Filed: May 8, 1996

[51] Int. Cl.$^6$ ............................................ H01M 10/46
[52] U.S. Cl. ........................... 320/21; 320/30; 320/39
[58] Field of Search ............................ 320/5, 14, 21, 320/22, 23, 24, 30, 32, 39, 40

[56] References Cited

U.S. PATENT DOCUMENTS

| | | | |
|---|---|---|---|
| 4,388,582 | 6/1983 | Saar et al. | 320/20 |
| 4,418,310 | 11/1983 | Bollinger | 320/39 |
| 4,503,378 | 3/1985 | Jones et al. | 320/20 |
| 4,742,290 | 5/1988 | Sutphin et al. | 320/21 |
| 4,746,852 | 5/1988 | Martin | 320/20 |
| 5,160,880 | 11/1992 | Palanisamy | 320/32 |

OTHER PUBLICATIONS

Yung et al., "A MicroController–Based Battery Charger Using Neural–Fuzzy Technology," IEE 1994, pp. 277–282.

*Primary Examiner*—Edward Tso
*Attorney, Agent, or Firm*—Crockett & Fish

[57] ABSTRACT

Batteries are charged using sequences of charge and discharge pulses in which a controller adjusts charge rate and/or terminates the charge process based on measurements taken during the preceding charge cycle and an internally computed algorithmic logic equation to optimize the charge cycle for the battery being charged. A preferred embodiment utilizes six sense parameters, three of which are $1^{st}$ order ($V_{ps}$, $V_{load}$ and $V_{unload}$) and three of which are $2^{nd}$ order ($V'_{ps}$, $V'_{load}$ and $V'_{unload}$). The charging scheme is applicable to batteries of many different types, including lead-acid, nickel-cadmium, and nickel-metal-hydride), and requires neither input of battery type nor instrumentation of the battery.

22 Claims, 5 Drawing Sheets

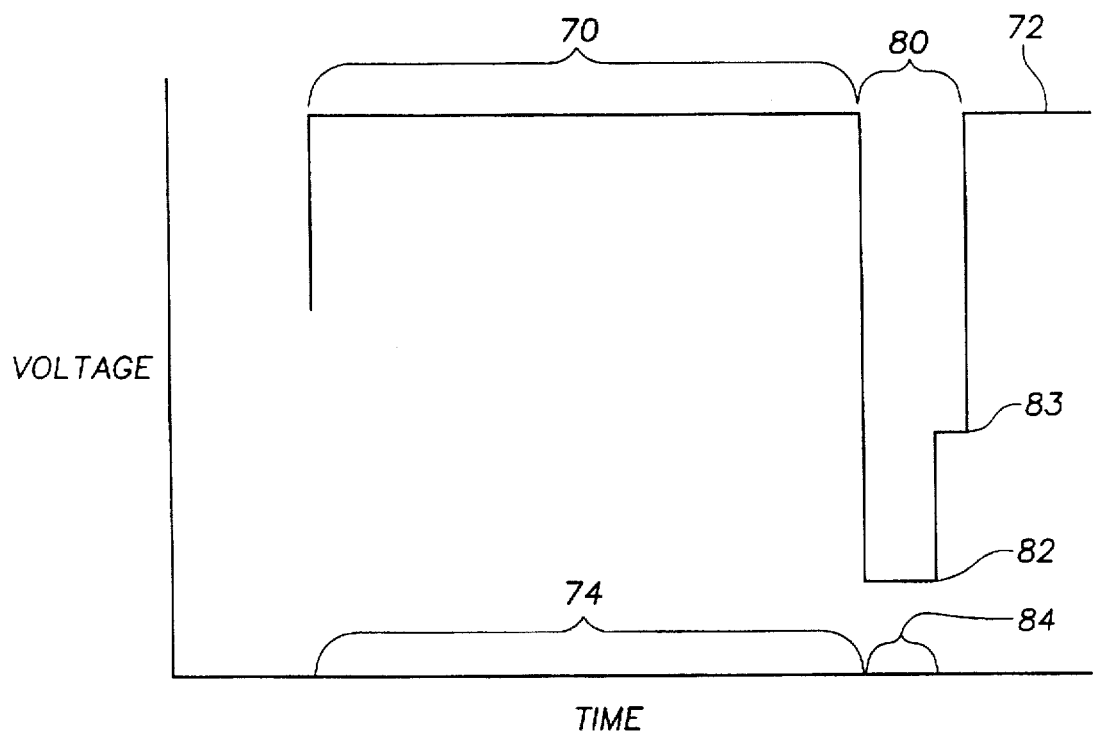

FIG.3

SAMPLE FUZZY LOGIC TABLES; INPUT VARIABLES

| RELATIVE ADDRESS | Vunload | Vload | V'load |
|---|---|---|---|
| +0 | −3 | 0 | −2 |
| +1 | −2 | 0 | −1 |
| +2 | −1 | 0 | 0 |
| +3 | 0 | 0 | +1 |
| +4 | 0 | 0 | +2 |
| +5 | 0 | 0 | |
| \| | 0 | 0 | |
| \| | 0 | 0 | |
| \| | 0 | 0 | |
| \| | 0 | 0 | |
| +41h | 0 | 0 | |
| +42h | +1 | +1 | |
| +43h | +2 | +2 | |
| +44h | +3 | +3 | |
| +45h | +4 | +4 | |
| +46h | +5 | +5 | |

NOTES: Addresses correspond to hexidecimal offsets equal to the output of the a/d converter. Table values are arbitrarily chosen for ease of computation.

SAMPLE FUZZY LOGIC TABLES; OUTPUT VARIABLES

| RELATIVE ADDRESS | Vunload and V'load | Vload and Vunload |
|---|---|---|
| −5 | ERROR | OFF |
| −4 | ERROR | OFF |
| −3 | OFF | OFF |
| −2 | OFF | OFF |
| −1 | OFF | OFF |
| 0 | ON | LONG |
| +1 | ON | MED SHORT |
| +2 | ON | MED SHORT |
| +3 | ON | MED SHORT |
| +4 | ON | MED SHORT |
| +5 | ON | SHORT |
| +6 | ON | SHORT |
| +7 | ON | SHORT |
| +8 | ON | SHORT |
| +9 | ON | SHORT |
| +A | OFF | COMPLETE |

NOTES: "VALUES" correspond to subroutine addresses that produce a corresponding pulse output.

METHOD AND APPARATUS FOR CHARGING BATTERIES

FIELD OF THE INVENTION

The present invention relates to the field of battery charging.

BACKGROUND

Battery chargers generally fall into two categories—(1) direct current (D.C.) chargers and (2) pulsed current chargers.

Direct current chargers typically utilize either a constant voltage mode in which the voltage is fixed and the current varies, or a constant current mode in which the current is fixed and the voltage varies. D.C. chargers give rise to several problems, many of which can be reduced or eliminated by limiting the maximum charging current to a low-value, and extending the charge cycle up to several hours. A typical low-value charging current would be one-tenth battery capacity, i.e., where the charging current falls at the battery's nominal amp-hour capacity divided by 10 hours. Thus, a ten amp-hour battery charging at a rate of 1 amp would employ a low-value charging current. Such chargers, known as trickle chargers, are advantageous in that they obviate the need for complex control schemes, and minimize the danger of reaching an overcharge condition. This is especially true in the constant voltage mode since current will reduce even further as battery voltage approaches the voltage of the charging source. The main drawback of trickle chargers is the inconvenience of being unable to use the battery for the 8 to 18 hours that are required to recharge, or alternatively, the expense of procuring additional battery packs to act as replacements during the recharge cycle. These disadvantages are especially relevant with respect to electric vehicle such as golf carts in which the batteries form an integral part of the device.

Trickle chargers, along with other D.C. chargers, are also problematic in that they tend to cause chemical breakdown (electrolysis) of the electrolyte. The phenomenon is common to all forms of rechargeable batteries, but is most commonly recognized in lead-acid batteries. In electrolysis, gasses form a boundary layer at the electrodes and interfere with the recharging process. The build-up of gasses increases the apparent impedance of the battery and causes current related heating that may result in failure of internal structures, or in the most severe case, an explosion. Even without damage or danger of explosion, the gasses may require venting and are generally hazardous. Electrolysis may also cause loss of electrolyte which is deleterious to the battery chemistry, causing reduced battery life and increased maintenance costs.

In pulsed battery chargers, the charging current is turned on and off periodically, thus allowing the gasses sufficient time to recombine into the electrolyte solution. A further improvement can be achieved by utilizing the period of recombination to apply short discharge pulses to the battery to "clean-up" the newly plated material, thereby eliminating contaminants and nodules in the plated matrix. This technique was originally developed and patented by G. W. Jernstedt (assigned to Westinghouse Electric) between 1948 and 1954, and adapted to battery chargers by W. B. Burkett and others (assigned to Christie Electric Corp) around 1971.

An added benefit of pulsed charging is that it allows much higher current density in the charge pulse, which may significantly reduce the charge time. There are practical considerations such as current carrying capacity of the internal battery structure that must be observed, so extremely short charge cycles (less than 0.1 hour) are rarely practical, but still may be possible. Major concern of a high rate charging system centers around when to stop charging, since even a moderate overcharge will cause battery temperature to rise drastically, and can cause explosion. Traditional approaches have been to stay on the safe side and terminate the charge before peak capacity has been achieved. More complex control schemes have been devised (e.g. U.S. Pat. No. 4,746,852 to Martin), but are largely limited to specific battery types where the charge curve is predictable. Many of these approaches depend on further instrumentation of the battery pack through addition of temperature sensors. In the case of the example above, identification modules are used to select a specific control mode based upon the signaling of a specific battery type. As used herein, battery type refers to the energy storage chemistry used in the battery. Popular battery types include lead-acid, nickel-cadmium, and nickel-metal-hydride chemistries.

It is known to vary the rate or end-point of battery charging as a function of $0^{th}$, $1^{st}$, $2^{nd}$ and $3^{rd}$ order sense parameters. 0th order sense parameters are those which do not vary over time. Examples include the expected maximum (reference) voltage of a particular type of battery, the maximum safe temperature of the battery during charging, or the maximum safe charging current. 1st order sense parameters are those which do vary over time. Examples include power supply voltage ($V_{ps}$), battery voltage upon application of a given load ($V_{load}$), battery voltage without any load ($V_{unload}$), and the three corresponding currents ($I^s$), ($I_{load}$) and ($I_{unload}$). $2^{nd}$ order sense parameters are time derivatives of the $1^{st}$ order sense parameters, and $3^{rd}$ order parameters are time derivatives of the $2^{nd}$ order parameters. Examples include the $2^{nd}$ order parameter $V'_{ps}$ (which is $dV_{ps}/dt$), and $V''_{ps}$ (which is $dV^2_{ps}/d^2t$).

Previous battery chargers have employed only simple combinations of $0^{th}$, $1^{st}$, $2^{nd}$ and $3^{rd}$ order sense parameters. For example, chargers are known which modify one or more charging parameters as a function of two different 1st order sense parameters, power supply voltage ($V_{ps}$) and temperature (T), but no second or third order parameters. Other chargers are known which modify one or more charging parameters as a function of one 1st order sense parameters such as temperature (T) and two different 2nd order sense parameters such as $V'_{ps}$ and T'. As used herein, "different sense parameters" means sense parameters which are functionally independent from one another. Thus, multiple time points of the same parameter, such as two temperature measurements at times T1 and T2 would constitute only one sense parameter. Similarly, corresponding voltage and current measurements such as $V'_{ps}$ and $I'_{ps}$, power supply voltage and current, respectively, would constitute only one sense parameter.

Relative to the earliest battery chargers which based the charging rate or end-point on a single parameter such as temperature (T) or power supply voltage ($V_{ps}$), the use of multiple sense parameters in more recent battery chargers has increased the charging rate and percent of maximum capacity at which such chargers can safely charge a battery. In general, however, such advances have not enabled battery charging to proceed at currents much greater than one or two times the battery capacity. Thus, a battery having a maximum capacity of ten amp-hours can still be charged at a maximum rate of only about or two amps. Furthermore, it has not been clear that employment of even more complex schemes using an even greater number of different sense parameters would provide additional benefits. Thus, to push battery chargers to charge at rates of five or ten times nominal battery capacity requires further developments.

SUMMARY OF THE INVENTION

The present inventor has discovered that batteries can be safely charged at rates of at least five or even ten times nominal battery capacity by employing a pulsed charger in which various charging parameters are modified as a function of a combination of at least two $1^{st}$ order sense parameters, and at least one $2^{nd}$ order sense parameter.

Preferably, the charger employs both charge and discharge pulses. In particularly preferred embodiments the charging parameters include charging end-point and ratio of charge pulse width to discharge pulse width, the sense parameters include $V_{load}$, $V_{unload}$, and $V'_{load}$, and the charging parameters are controlled by a microprocessor utilizing fuzzy logic. In most preferred embodiments the charger utilizes six sense parameters, three of which are $1^{st}$ order ($V_{ps}$, $V_{load}$ and $V_{unload}$) and three of which are $2^{nd}$ order ($V'_{ps}$, $V'_{load}$ and $V'_{unload}$)

BRIEF DESCRIPTION OF THE DRAWING

The present invention will become better understood through a consideration of the following description taken in conjunction with the drawing in which the same reference characters denote corresponding elements throughout the several views.

FIG. 2 is a graph of an exemplary idealized charge pulse generated by the device of FIG. 1.

FIG. 3 is an exemplary fuzzy logic lookup table for the device of FIG. 1.

DETAILED DESCRIPTION

Figure 1:
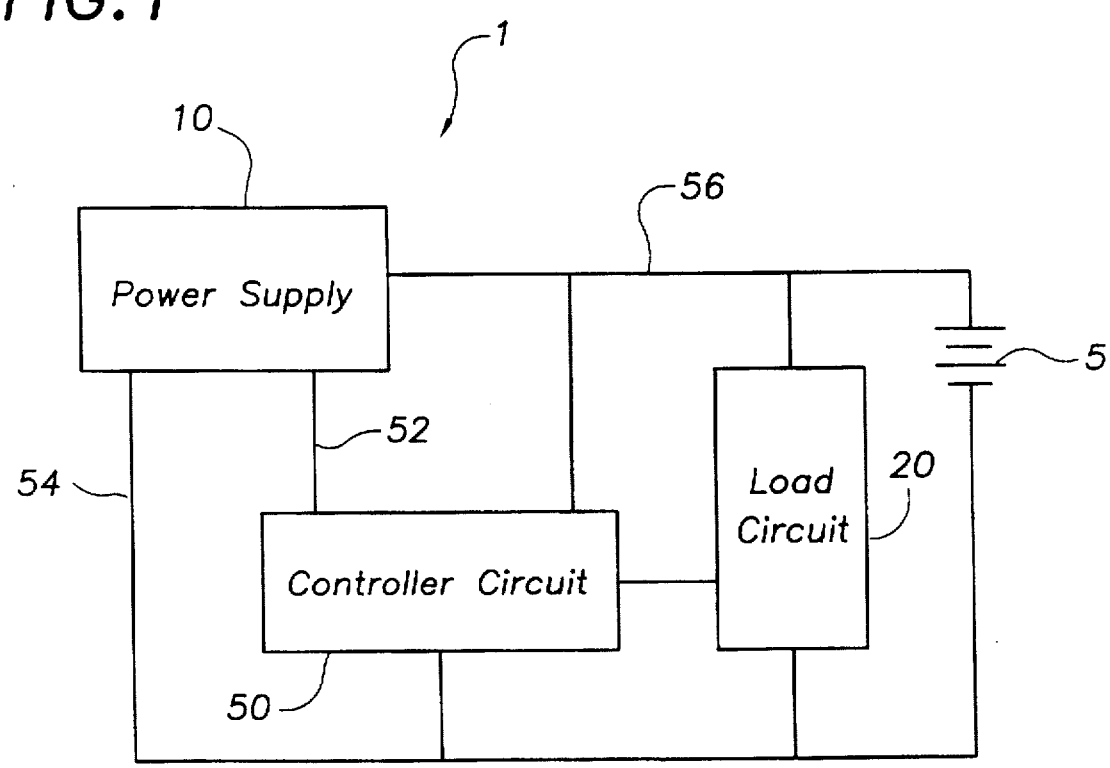
FIG. 1 is a block diagram of a battery charger according to the present invention.

In FIG. 1 a battery charger 1 operates upon a battery 5, and generally comprises a switchable D.C. power supply 10, a constant current load circuit 20, and a controller circuit 50. The switch input is carried along line 52 and the charger output relative to ground 54 is carried along line 56.

Power supply 10 is preferably a switching power supply having electronic on/off control due to ease of control and higher efficiency relative to simple linear supplies. Power supply 10 is advantageously of the constant current type, although charger 1 could also be designed with a constant voltage power supply. Satisfactory power supplies are known in the industry, and preferably have the following characteristics. The power supply voltage for the constant current case should be approximately 110% of the maximum battery voltage to insure enough compliance voltage to overcome contact and conductor resistance through the charge path. For a constant voltage charger, the maximunm voltage should be equal to the maximum battery voltage. Maximum battery voltage may be found in battery handbooks that are commonly available or by contacting battery manufacturers directly. Although the preferred power supply type is a high efficiency switching power supply, linear supplies (transformer/rectifier combinations) have been used with success with the addition of an output switch. However, there is a severe penalty in overall efficiency when using a linear supply. In the preferred embodiments, the supply output is controlled (on/off) by a standard CMOS input, where a switching power supply is used, "soft start" output rise time pulse shaping should be employed to eliminate overshoot and reduce external noise radiation. The power supply maximum current output is calculated as follows:

$$I_{max} = (\text{battery capacity})/(t_{max})$$

where $I_{max}$=maximum supply current in amperes; battery capacity =nominal battery capacity in ampere-hours; and $t_{max}$=maximum desired charge time in hours. In this application it is thought that current limiting must have little ($\leq 10\%$) or no foldback to be effective. At present the preferred power supply is a Jeta Power Systems, Inc. Model TA200030-50112.

Figure 5:
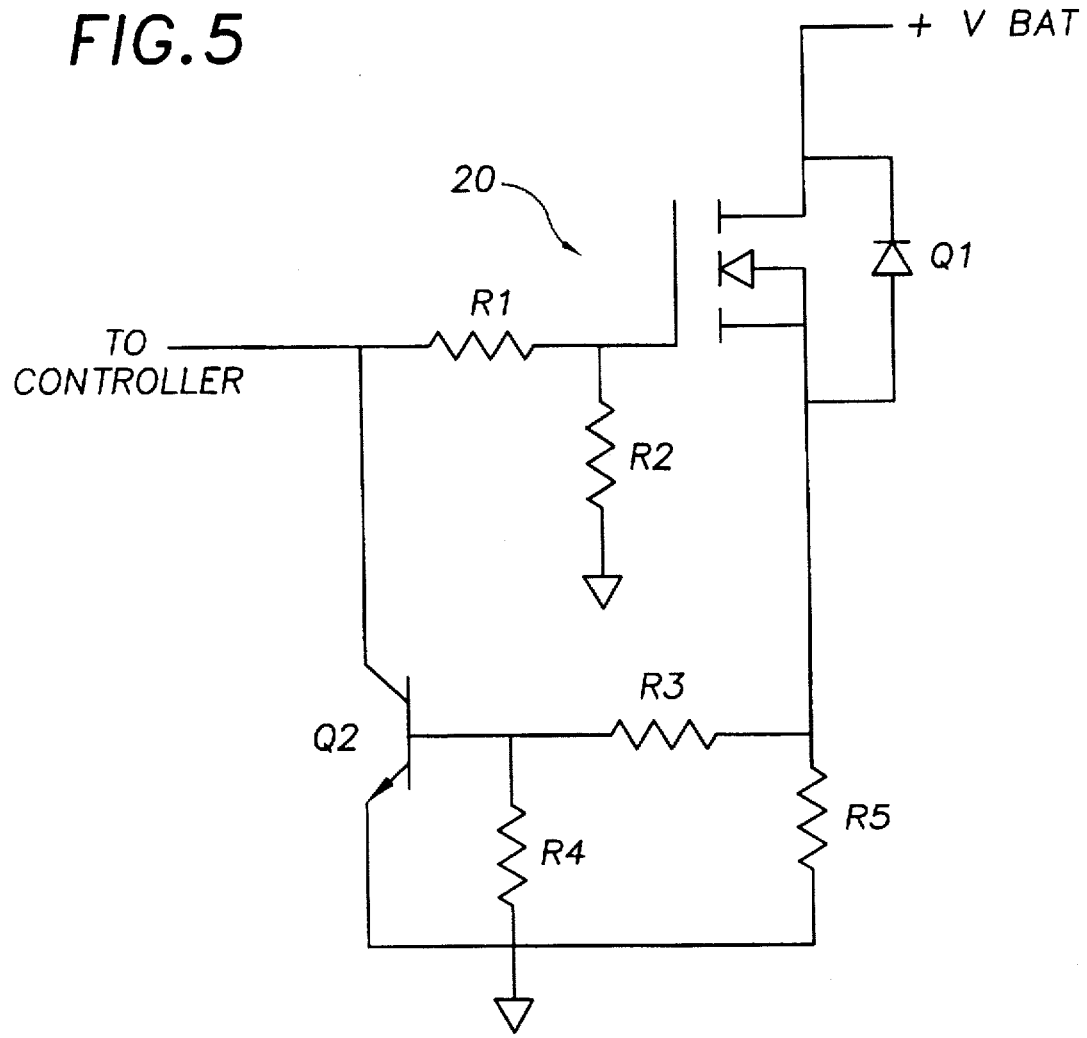
FIG. 5 is a schematic of the constant current load of FIG. 1.

Load circuit 20 is preferably of the constant current type, utilizing active devices to clamp current at a specific value regardless of input voltage, and having an electronic on/off control. Satisfactory loads are known in the industry, but the presently preferred load is a custom unit as shown in the schematic of FIG. 5, described more fully below.

Controller circuit 50 is preferably a microcontroller integrated circuit consisting of an arithmetic logic unit, various shift registers, random access memory, read-only-memory, and input/output functions including an A/D converter. Suitable chips for use in controller circuits are available from many different suppliers, including Motorola, Intel and Microchip as custom designed units. The presently preferred controller circuit chip is a Motorola MC68HCO5P9P.

Controller circuit 50 is programmed to measure at least two time dependent sense parameters during the charge cycle, to calculate the rate of change for at least one of the measured sense parameters, and to use that information to modify various charging parameters. In pulse chargers, controller circuit 50 initiates and modifies a stream of charge and discharge pulses by alternately turning the power supply 10 and load circuit 20 on and off in a cycle. The cycle is repeated until certain conditions of the sense parameters indicate that a new cycle having different charging parameters should be applied.

FIG. 2 depicts an exemplary idealized charge pulse generated by the device of FIG. 1. The charge pulse 70 has a voltage $V_{ps}$ (power supply voltage), and a charge pulse duration 74. The discharge pulse 80 has two distinct voltages, $V_{load}$ (load voltage) 82 and $V_{ul}$ (unload voltage) 83, and a discharge pulse duration 84. All of these pulse parameters are considered charging parameters, and are all preferably controlled by controller circuit 50.

There are numerous sense parameters which can be used by controller circuit 50 to modulate the charge and discharge pulses. The five preferred $1^{st}$ order sense parameters are: (1) Power supply voltage ($V_{ps}$), which is the voltage of the power supply across the battery during a charging pulse; (2) Power supply current ($I_{ps}$), which is the current flowing from the power supply to the battery during a charging pulse; (3) Load voltage ($V_{load}$), which is the voltage across the battery upon application of the constant current load; (4) Load current ($I_{load}$), which is the current flowing from the battery through the constant current load; and (5) Unload voltage ($V_{unload}$), which is the voltage across the battery with no load and no charge pulse applied. Of these $1^{st}$ order sense parameters, $V_{load}$ and $V_{unload}$ are thought to be the most useful. $V_{load}$ is thought to be the best measure of the ultimate battery capacity, and $V_{unload}$ is thought to be the best measure of percent of maximum charge held by the battery at any given moment. There are several other $1^{st}$ order sense parameters which can be utilized in operative embodiments, but these other possible parameters are considered to be less useful. Battery temperature, for example, is considered to be less useful because it may require an internal battery temperature sensor, and because thermal conduction may not occur rapidly enough to optimally control the charging rate. Obviously, each of the $1^{st}$ order sense parameters can be used to determine a $2^{nd}$ order sense parameter, which is a time derivative or "slope" of the respective $1^{st}$ order parameter. Among the possible 2nd order parameters, $V'_{load}$ is thought to be the most useful because it most closely reflects the slope of the charge curve. Presently preferred embodiments utilize six sense parameters, three of which are $1^{st}$ order ($V_{ps}$, $V_{load}$ and $V_{unload}$) and three of which are $2^{nd}$ order ($V'_{ps}$, $V'_{load}$ and $V'_{unload}$).

Preferred embodiments utilize four major charging parameters: pulse width of the charge pulse; pulse width of the discharge pulse; maximum charge pulse current, and average discharge current. Rest periods may also occur between the pulses, and each of the charging parameters may be varied independently. From empirical evidence it is found that the charge pulses can vary advantageously from about 1.5 sec to 0.15 sec, and the discharge pulses can vary advantageously from about 0.005 sec to 0.002 sec. In practice, all of the charging parameters would be produced by the circuit in accordance with one or more lookup tables such as that shown in FIG. 3, which may be stored on read-only memory. A major advantage of using lookup table is that a battery charger can thereby automatically accommodate batteries of different chemistries by determining an appropriate cut-off condition for the battery being charged.

Although several million combinations of pulse width and frequencies are possible with this scheme, only two have shown themselves to be of practical value, long and short. The application of a long duration charge and long duration discharge is beneficial in the beginning of the charge cycle where depleted matrices need to be built up more rapidly, and there is an excess of material available to do so. Conversely, as the process continues, short pulses provide finer surface finishes and allow more monitoring of all parameters leading to a final decision to terminate the charge (a third condition of pulse duration-off).

Interestingly, experiments have shown that the actual definition of "long" and "short" varies as a function of battery capacity, but not necessarily as a function of battery type. This distinction is advantageous because it permits batteries of many different types to be charged using the same charger, as long as the controller circuit can recognize the batteries' maximum voltage and capacity. In general, such recognition is performed by the controller logic circuit using the look-up tables as set forth herein.

There are, of course, an enormous number of possible look-up tables similar to that of FIG. 3. In general, such tables can be generated empirically by plotting charge curves for several batteries under different environmental conditions. In some instances the table can also be generated by examining reference guides for particular batteries. For example, McGraw-Hill publishes a reference guide entitled *Handbook of Batteries*, by David Linden.

Other charging parameters besides pulse width and pulse frequency can also be utilized in the charging of batteries. For example, in the presently preferred embodiments the respective amplitudes of the charge and discharge pulses are relatively constant, and are determined by the voltage output of the power supply 10 and load circuit 20. These amplitudes, however, could be modified by controller circuit 50, or by other controllers. As another example, the shape of the charge and/or discharge pulses can be modified. In FIG. 2, both charge and discharge pulses are essentially square waves. But here again many other wave shapes are possible, and such shapes may be under control of either the controller circuit 50 or some other controller.

Figure 4:
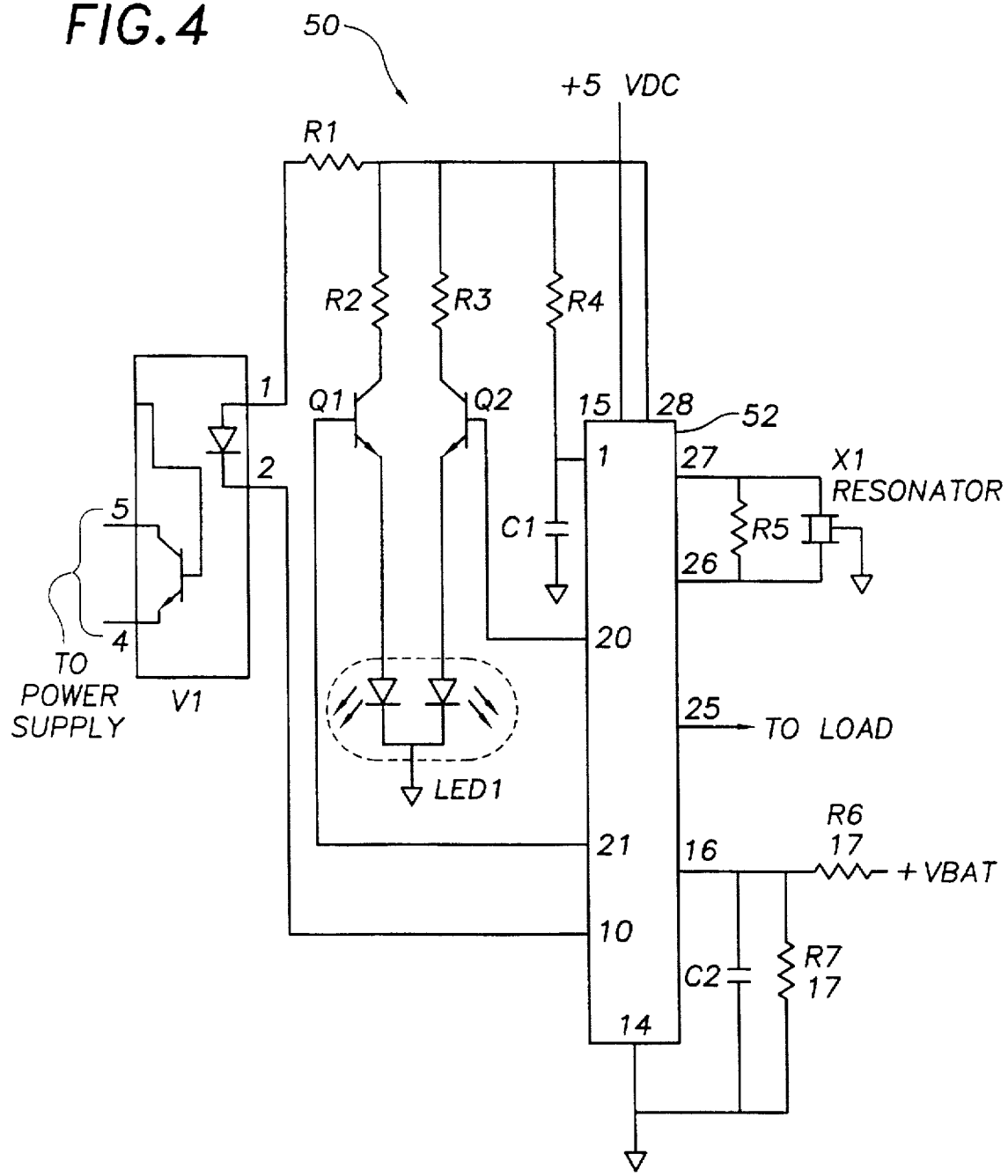
FIG. 4 is a block diagram of the controller circuit of FIG. 1 showing additional detail.

FIG. 4 provides additional details of controller circuit 50. Controller circuit 50 includes in operative combination a logic device such as a microprocessor, a memory device such as a read-only memory (ROM), and at least one analog to digital converter, all of which may be present on the same controller chip 52. The numerals immediately surrounding chip 52 are pinout positions. While other types of controller circuits may be employed, controller circuit 50 advantageously uses a fuzzy logic to modify the charging parameters. Definitions used to describe the preferred fuzzy logic system are as follows:

Fuzzy logic—A logical system of rules that allows a computer which operates in precise terms to deal with the real world where conditions are rarely precise. These rules may be expressed in terms of "if-then" statements, and results are expressed as words instead of numbers.

Crisp—Real world inputs and outputs that are determined from, or submitted to the process of fuzzification.

Fuzzification—A process of converting real world inputs into fuzzy logic terms such as "high", "low", "flat", etc.

Defuzzification—A process of converting fuzzy logic outputs into crisp values for use in the real world.

Degree of membership (DOM)—The degree to which an input supports the "if" condition of the fuzzy logic rule base. Fuzzy logic break points are not precise (otherwise the system is better expressed in crisp terms).

Degree of Support—A weighting factor that can be used to de-emphasize variables.

Using these definitions, the presently preferred fuzzy logic operates in the following manner.

IF: charge voltage is high (DOM(high)=1)and load voltage is high(DOM(high)=1)and unload voltage is high (DOM(high)=1)and rate of change of charge voltage is flat(DOM(flat)=1)and rate of change of load voltage is flat(DOM(flat)=1) and rate of change of unload voltage is flat(DOM(flat)=1)

THEN: pulse duration is off

In the above system, degree of membership (DOM) of any variable can vary from zero to one, and any variable may have up to 4 different literal conditions (high, medium, low, or zero for example) and the method of computation used to determine DOM for the output variable (pulse duration) as "long", "short", or "off" is a "Center of Maximum" (COM) calculation. All of this may seem overly complex for small microcontrollers to handle, but in practice, fuzzification and defuzzification break down to look-up tables that are indexed by the crisp value of the variable or output (tables work in both directions), and the computations required to build the tables can be handled by more powerful computers and attached to the control program. The main task in optimizing a charge cycle is to pick appropriate break points for each variable and output that encompass the highly variable charge curves found in different battery types. In doing so, the designer will preferably want to maximize the charging current and charge end-point consistent with safety.

In FIG. 5, the load is of the constant current type, and comprises Q1, Q2 and metering resistor R5. Other resistors are selected to establish bias current for Q1 and Q2. Metering resistor R5 is selected to produce approximately 1.8 volts at the selected load current. With the 1.8 volts on the base of Q2, the transistor begins to conduct, pulling the gate of Q1 down and increasing the source to drain resistance of the device. The controller supplies a 5 volt pulse that initiates the action of the circuit. In a most preferred embodiment, Q1 is an IRFP250 high power F.E.T., Q2 is an MPSA05 small signal transistor, and R5 is a 0.025 ohm, 10 watt resistor for a load current of approximately 70 amps.

Thus, novel battery charger method and apparatus have been disclosed herein. While specific embodiments and applications have been shown and described, it would be apparent to those skilled in the art that additional modifications are possible without departing from the inventive concepts herein. For example, controller 50 is not limited to the design shown, and could be constructed in many different ways, including digital or analog designs, and incorporating fuzzy or other types of logic, or other means of control. Moreover, the control strategy may or may not be split among separate chips. For example, the look-up tables could be located in the microprocessor, or could be located in "off-chip" read-only-memory, albeit with an added penalty of access time and complexity. The invention, therefore, is not to be restricted except in the spirit of the appended claims.

What is claimed is:

1. A battery charger for charging a battery comprising:
   a sensing circuit which senses at least two different 1st order sense parameters and at least one 2nd order sense parameter;
   a charging circuit capable of charging the battery according to a plurality of charging parameters; and
   a control circuit which modifies at least two of the charging parameters as a function of the at least two 1st order and at least one 2nd order sense parameters sensed by the sensing circuit.

2. The battery charger of claim 1 wherein the sense parameters comprise at least two of $V_{ps}$, $V_{load}$ and $V_{unload}$.

3. The battery charger of claim 1 wherein the sense parameters comprise $V_{load}$ and $V_{unload}$.

4. The battery charger of claim 1 wherein the sense parameters comprise at least one of $V'_{ps}$, $V'_{load}$ and $V'_{unload}$.

5. The battery charger of claim 1 wherein the sense parameters comprise at least one of $V'_{load}$ and $V'_{unload}$.

6. The battery charger of claim 1 wherein the sense parameters comprise $V_{load}$, $V_{unload}$ and at least one of $V'_{load}$ and $V'_{unload}$.

7. The battery charger of claim 1 wherein the sense parameters comprise $V_{ps}$, $V_{load}$, $V_{unload}$, $V'_{ps}$, $V'_{load}$ and $V'_{unload}$.

8. The battery charger of any of claims 1–7 wherein the charging parameters comprise charging pulse width and discharge pulse width.

9. The battery charger of any of claims 1–7 wherein the charging parameters comprise charging pulse width and discharge pulse width, and the control circuit utilizes fuzzy logic.

10. The battery charger of any of claims 1–7 wherein the charging parameters comprise charging pulse width and discharge pulse width, the control circuit utilizes fuzzy logic, and the sensing circuit not dependent upon temperature of the battery.

11. The battery charger of claim 10 wherein the charging parameters are capable of being modified at least every 1.5 seconds.

12. A method of recharging a battery comprising:
   detecting values for at least two parameters selected from the list of power supply voltage, loaded battery voltage, unloaded battery voltage;
   determining a time derivative of at least one of the detected parameters;
   using the detected values and the time derivative to determine appropriate charging characteristics; and
   delivering charging and discharging pulses to the battery in accordance with the appropriate charging characteristics.

13. The method of claim 12 wherein the step of using the detected values further comprises applying fuzzy logic to determine the appropriate charging characteristics.

14. The methods of claims 12 or 13 wherein the step of determining the appropriate charging characteristics includes determining the relative widths of the charging and discharging pulses.

15. The methods of claims 12 or 13 wherein the step of determining the appropriate charging characteristics includes determining the amount of charge delivered to the battery during the charging pulse and determining the amount of charge withdrawn from the battery during the discharging pulse.

16. The methods of claim 15 wherein the step of using the detected values and the time derivative to determine appropriate charging characteristics occurs at least every 1.5 seconds.

17. A battery charger which automatically accommodates batteries of different chemistries by determining an appropriate cut-off condition for the battery being charged, said battery charger comprising:
   a sense circuit which senses values for at least two different voltages;
   a first circuit which calculates a time derivative for at least one of the sensed voltages;
   a second circuit which utilizes the sensed voltages and the time derivative to determine the cut-off condition;
   a controller which controls delivery of charge and discharge pulses to the battery being charged as a function of the sensed voltages, the time derivative and the cut-off condition.

18. The battery charger of claim 17 wherein the sensed voltages are selected from the list of power supply voltage, loaded battery voltage, unloaded battery voltage.

19. The battery charger of claims 17 or 18 wherein the second logic circuit comprises a general purpose processor programmed as a fuzzy logic controller, and at least one look-up table.

20. The battery charger of claim 19 wherein the controller is capable of modifying the respective widths of the charge and discharge pulses at least every 1.5 seconds.

21. A battery charger capable of safely charging rechargeable batteries using an average charging current in amps of at least five times nominal battery capacity expressed in amp-hours, comprising a sensing circuit, a charging circuit and a control circuit.

22. The battery charger of claim 21 wherein the charger is capable of safely charging rechargeable batteries using an average charging current in amps of at least ten times nominal battery capacity expressed in amp-hours.

* * * * *